United States Patent

Waizmann et al.

[11] Patent Number: 5,919,246
[45] Date of Patent: Jul. 6, 1999

[54] TARGET INPUT FOR NAVIGATION SYSTEM

[75] Inventors: Gerd Waizmann, Riedering; Paul Garthwaite, Baldham; Uwe Albrecht, München, all of Germany

[73] Assignee: Mannesmann Aktiengesellschaft, Düsseldorf, Germany

[21] Appl. No.: 08/817,319

[22] PCT Filed: Oct. 5, 1995

[86] PCT No.: PCT/DE95/01414

§ 371 Date: Apr. 7, 1997

§ 102(e) Date: Apr. 7, 1997

[87] PCT Pub. No.: WO96/11380

PCT Pub. Date: Apr. 18, 1996

[30] Foreign Application Priority Data

Oct. 7, 1994 [DE] Germany .............................. 44 36 992
Sep. 14, 1995 [DE] Germany ............................. 195 35 576

[51] Int. Cl.$^6$ ................................................. G06F 165/00
[52] U.S. Cl. .......................... 701/209; 701/210; 340/990; 340/995
[58] Field of Search ..................................... 701/200, 202, 701/208, 209, 210; 73/178 R; 340/988, 990, 995

[56] References Cited

U.S. PATENT DOCUMENTS

| | | | |
|---|---|---|---|
| 4,954,958 | 9/1990 | Savage et al. | 701/202 |
| 4,992,947 | 2/1991 | Nimura et al. | 701/210 |
| 5,206,811 | 4/1993 | Itoh et al. | 701/209 |
| 5,237,323 | 8/1993 | Saito et al. | 340/995 |
| 5,406,490 | 4/1995 | Braegas | 701/210 |
| 5,774,824 | 6/1998 | Streit et al. | 701/210 |
| 5,818,356 | 10/1998 | Schuessler | 701/210 |

*Primary Examiner*—Gary Chin
*Attorney, Agent, or Firm*—Cohen, Pontani, Lieberman & Pavane

[57] ABSTRACT

A process and a device for providing navigational assistance to a vehicle driver in reaching a target position in a vehicle, in which the current local position is identified, a route is determined and current travel tips for this route are obtained from a traffic computer, which is disposed outside of the vehicle, and are displayed to the driver. To provide fully automatic navigational assistance in which the driver's input is minimized, especially in the case of frequently repeated routine trips, the target position is derived automatically, according to probability, on the basis of stored historical travel information.

23 Claims, 1 Drawing Sheet

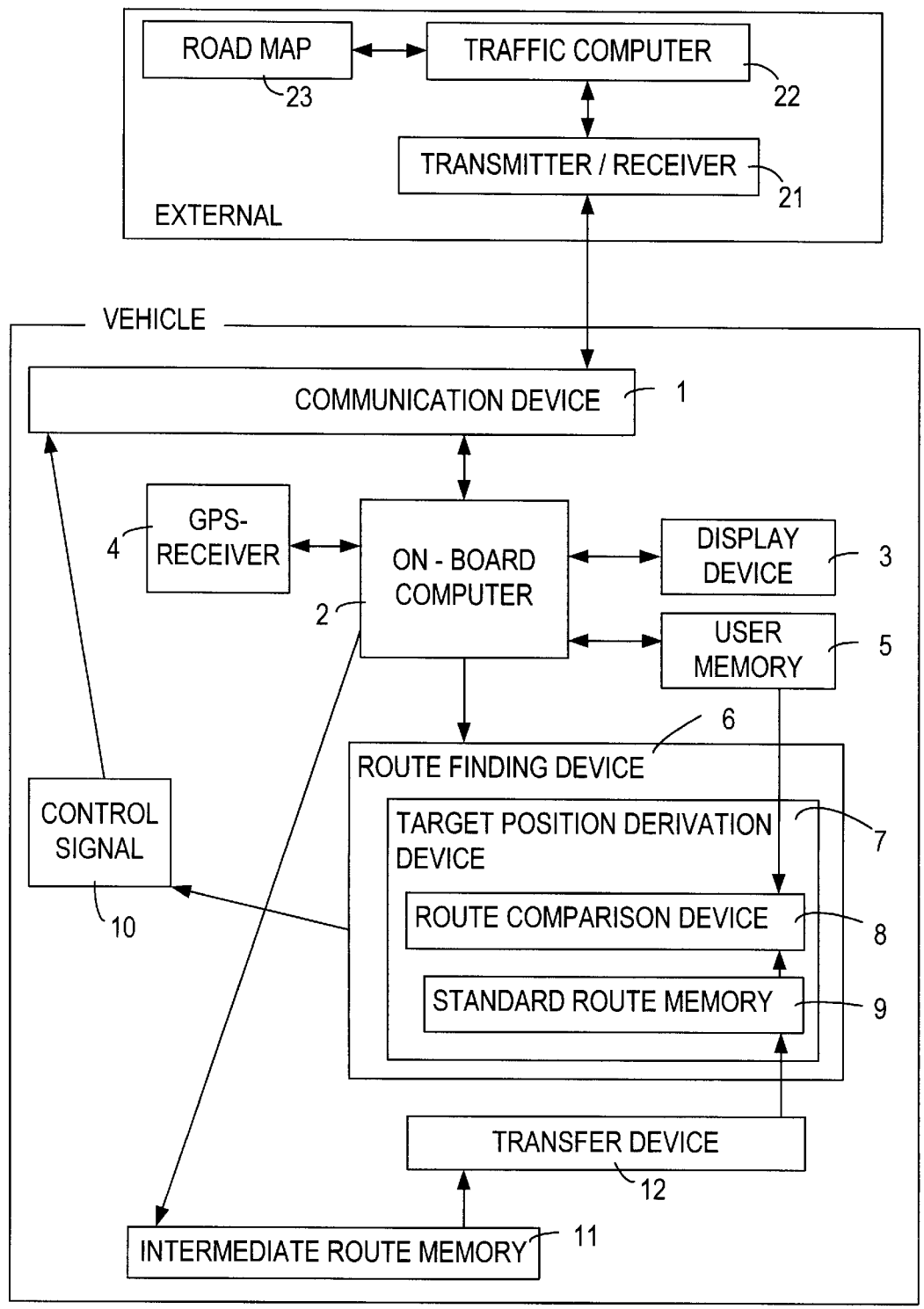

TARGET INPUT FOR NAVIGATION SYSTEM

BACKGROUND OF THE INVENTION

1. Field of the Invention

The present invention relates to a process and a device for providing navigational assistance to a driver in reaching a target position with a vehicle. More particularly to a process in which the current local position of the vehicle is identified, a route is determined and current travel tips for the route are obtained from a traffic computer, which is disposed outside of the vehicle, and are displayed to the driver.

2. Description of the Prior Art

Vehicle guidance and navigation systems, especially off-board navigation systems, having optical and/or acoustical output devices for travel tips to guide a vehicle driver along a determined route to a preestablished target destination are known. These systems are used, for example, to display information based on digitalized road maps, which are stored in or outside of the vehicle, to drivers unfamiliar with an area. This information concerns, for example, the current geographical position, the route and the impending directional changes.

In the process known from DE 4039887, the desired target position is input manually and the current geographical position is determined by a position-finding system installed in the vehicle. The target position and the current geographical position are then transmitted to an off-board navigation system, which determines a route on the basis of a digital road map, taking into account current traffic information. Finally, this route, together with the road network in the area near the vehicle, is transmitted by the off-board navigation system to the vehicle and shown on a display, highlighted by means of color, for example, using simple arrows or directional symbols.

In this and other known guidance systems, it is disadvantageous that the driver must always input the target in some form. For many drivers, this requirement is especially burdensome in the case of routine trips (e.g., the daily drive to and from work). Because the routes in such cases are so well known to them, drivers often fail to enter their targets. Thus, drivers often fail to use the guidance system, even though systems that provide information on current traffic conditions can provide valuable assistance, even in the case of daily trips to the same destination, by guiding a vehicle to its target along the fastest of several possible routes, especially when traffic jams and the like occur on the route of travel.

SUMMARY OF THE INVENTION

The object of the present invention is to provide a process for fully automatic navigational assistance, especially for frequently repeated routine trips, in which the driver's input is minimized. The navigational assistance is to be operative, in particular, during traffic jams, short-term detours, etc. In addition it is an object of the invention to provide, a device to implement this process.

Pursuant to these objects, and others which will become apparent hereafter, one aspect of the present invention resides in a process for providing navigational assistance to a vehicle driver in reaching a target position in a vehicle, which process includes the steps of identifying a current local position, determining a route, deriving the target position automatically according to probability by comparing stored historical travel information with current travel information, obtaining current travel tips for the route from a traffic computer disposed outside the vehicle, and relaying the tips to the driver.

Another aspect of the invention resides in a device for providing navigational assistance to a vehicle driver in reaching a target position, which device includes local position finding means for detecting a current local position, route finding means, communication means for exchanging data with a traffic computer disposed outside the vehicle, and means for relaying travel tips to the vehicle driver. The route finding means includes a target position derivation device operative to automatically drive the target position, according to probability, based on stored historical travel information.

According to the invention, the target position is determined automatically, based on probability, by comparing stored travel information from the past with current travel information.

Navigational assistance that automatically identifies targets in this manner can assist drivers during many trips without requiring them to input their target destinations into the system. The invention starts from the realization that it is during frequently repeated trips, in particular, that most drivers will find it burdensome to input their familiar targets for the sake of learning about traffic jams, etc., along their usual route. Furthermore, the very fact that routine trips always involve the same route makes it possible, using stored travel information from the past, to derive the target position and thus the route from the initial course and/or the current time data. The navigation system advantageously allows travel tips to be displayed only in cases of slowdowns or obstacles to the traffic flow, e.g., traffic jams. If no obstacles are present, this fact can also be displayed to the driver.

The invention proposes that the current local position of the vehicle be detected continuously and stored in a user memory, and that the target position be determined on the basis of the current local positions stored during the first phase of a trip. Thus, the target position and then the route are derived from the initial course of the current route; in other words, the route that the vehicle will have travelled at the end of its journey is predicted.

In an alternative embodiment of the invention, the target position and thus the route are determined on the basis of chronological data, including the time of day that the trip begins. This method is especially advantageous in the case of trips that regularly begin at the same time each day, e.g., the daily drive to work, because in such cases it is more probable that the target destination can be derived from the starting time of the trip, once the appropriate past chronological data, together with the route, are collected and stored. Especially reliable predictions can be achieved when the target position is determined using geographical data as well as chronological data about past travel.

In another embodiment of the invention, to find the target position on the basis of the initial course of the current route, i.e., the stored current local positions, these stored current local positions are compared with a standard route memory, in which are stored standard routes travelled in the past. If the stored current local positions correspond to a particular initial segment of a route in the standard route memory, the target position and standard route in question are derived (identified) as the current route. To minimize the display of erroneous travel tips, which could also be considered burdensome by drivers, it is also proposed that agreement with a route or segment in the standard route memory be assumed only when that agreement exists at a predetermined level of statistical certainty. A value of 95%, for example, can be established for this. However, as an alternative, it is also possible to have the driver confirm the determined target position, especially when services for which fees are charged will be used.

To update the inventory of stored standard routes, the stored current local positions are automatically stored at the end of each trip in an intermediate route memory for a predetermined period of time. A route is transferred from the intermediate route memory to the standard route memory when the frequency with which the route is found in the intermediate route memory exceeds a predetermined value. To avoid filling the intermediate route memory unnecessarily, routes stored in the intermediate route memory are deleted after a predetermined period of time or after being transferred into the standard route memory.

It is also proposed that the standard routes be stored together with chronological data, which preferably include the time of day and the day of the week. In this way, the standard routes can be used, in particular, to find the target position and thus the route on the basis of chronological data.

Advantageously, the target position is determined by calculating programs that are run on a computer mounted in the vehicle.

A preferred navigational assistance device has a local position-finding device, which can be used to find the current local position. Furthermore, the navigational assistance device has a route finding device, which in turn is equipped with a device to derive the target position, based on probability, from stored historical travel information. The route-finding device is connected to a communication device, which is used to obtain current travel tips from a traffic computer disposed outside of the vehicle. The travel tips are shown on a display device installed in the vehicle. The navigational assistance device ensures that in the event of traffic jams, etc., the driver will receive travel tips for his route even during routine trips, when, as a rule, he will not have input his target position.

The invention proposes that the current local position be continuously detectable by the location-finding device and that a user memory be provided to store the continuously detected current local positions. The target position can be derived by the target position derivation device, which has stored decision criteria at its disposal, from the current local positions stored up to that point, i.e., from the initial course of the current route.

In an alternative embodiment of the invention, the travel data includes chronological data, which include, at least, the time that the trip begins, and the target position can be derived by the target position derivation device from the chronological data.

To take into account frequently travelled past routes, the target position derivation device has a standard route memory, in which standard routes are stored in the form of consecutive local positions, as well as a comparison device, which compares the stored current local positions with the standard routes in the standard route memory for the purpose of determining the target position.

To update the inventory of standard routes, there is an intermediate route memory, in which the stored current local positions can be automatically stored at the end of each trip. A transfer device is also provided, which permits routes to be transferred from the intermediate route memory into the standard route memory when the frequency with which a given route is travelled exceeds a predetermined value. The frequency relates to a predetermined period of time, preferably in the immediate past.

To carry out the relatively complicated collection and comparison operations, there is preferably an on-board computer in the vehicle. The target position derivation device is a calculating program that is stored in the user memory of the on-board computer and has at least one statistical computing algorithm.

The communication device for exchanging data with the external traffic computer is preferably embodied as a mobile phone.

BRIEF DESCRIPTION OF THE DRAWING

An example of the invention is described below in reference to the system shown in the single drawing of a vehicle navigational system, which has a navigational assistance device in the vehicle and an external traffic computer.

DETAILED DESCRIPTION OF THE PREFERRED EMBODIMENTS

The vehicle navigation system shown schematically in the drawing comprises an external system unit and a system unit located in the vehicle. The system unit in the vehicle has a communication device 1, by means of which data can be transmitted to the external system unit. The communication device 1 is connected to an on-board computer 2, which is provided in the vehicle and used to control the vehicle-internal devices. Thus, the on-board computer 2 is connected to a display device 3, which displays the travel tips for the driver. The tips can be provided optically and, in addition, acoustically, particularly in the form of a voice output. There is a GPS (Global Positioning System) receiver 4 installed in the vehicle to receive satellite navigation signals for the continuous detection of the current local position of the vehicle. The GPS receiver 4 is connected via the on-board computer 2 to a working memory 5, in which the detected local position data can be stored, together with the corresponding chronological data, especially the time of day at which a trip begins. To derive the current target position and route from the local position data stored in the memory 5 in the form of stored current local positions, there is also a route-finding device 6 that is connected to the on-board computer 2. The route-finding device in turn has a target position derivation device 7. In the illustrated embodiments, the target position derivation device 7 comprises a route comparison device 8, which can access the stored current local positions in the working memory 5 and has typical routes stored in a standard route memory 9. Of course, the standard route memory 9 can also be located outside of the vehicle, especially when the standard routes belong to an organized entity, e.g., a bus company. The route comparison device 8 permits the current route to be compared with the routes stored in the standard route memory 9. On this basis, the actual current travel objective (target position) of the vehicle can be predicted. The route finding device 6 is connected to the communication device 1 in such a way that a control signal 10 can cause current travel tips for the route to the current target position to be obtained by the communications device 1.

When a trip ends, the stored current local positions can be stored in an intermediate route memory 11, which is connected to the on-board computer 2. The intermediate route memory 11 is connected to the standard route memory 9 by a transfer device 12. The transfer device 12 permits travel routes to be transferred from the intermediate route memory 11 into the standard route memory 9 when the frequency with which a route is travelled during a given past period of time exceeds a certain value, which is preestablished or can be established by the driver. The transfer device 12 thus permits all routes stored in the intermediate route memory 11 to be compared with one another. In this way, the frequency with which a given route occurs in the intermediate route memory 11 can be determined. The routes stored in the intermediate route memory 11 preferably include chronological data, especially the time of day, the day of the week and the month that the travel route in question began. A suitable updating algorithm can be used to update the intermediate route memory 11. The updating algorithm deletes all those routes stored in the intermediate route memory 11 whose times fall outside a predetermined time period.

When navigational assistance is provided to the driver, the current local positions are continuously detected, once the vehicle starts, with the help of the GPS receiver 4 and the on-board computer 2. The positions are stored in the memory 5 as the stored current local positions. The target position and thus the route presumably desired by the driver are determined by the route finding device 6 from the current route travelled up to the given point in time. For this purpose, the target position derivation device 7 is asked by the route comparison device 8 at brief time intervals to compare the stored current local positions with the routes in the standard route memory 9. A standard route stored in the standard route memory 9 will be identified as the current route if the latter corresponds to at least one segment of the route stored in the standard route memory 9 with a predetermined statistical certainty. To avoid erroneous identifications, a value of at least 95% is provided for the predetermined statistical certainty; alternatively, by pressing a button or the like, the user may tell the system that the route currently being travelled is a standard one. This allows the number of erroneous identifications to be further reduced. If a current route is found with the preestablished statistical certainty, a control signal 10 is sent from the route finding device 6, whereupon the communication device 1 obtains traffic information on this current route from the traffic computer 22 via a transmitter/receiver 21. After receiving such a request, the traffic computer 22 transmits current travel tips and/or a current alternative route to the vehicle obtains from a digital road map 23.

The standard routes are determined as follows: After a trip ends, the stored current local positions are stored in the intermediate route memory 11. The routes stored in the intermediate route memory 11 are transferred by the transfer device 12 into the standard route memory 9 when a route is present in the intermediate route memory 11 more frequently than a given number of times. The routes in the intermediate route memory 11 are deleted after being transferred into the standard route memory 9. Deletion also occurs when the chronological data for a route stored in the intermediate route memory 11 lie outside of a given time period. Routes in the standard route memory 9 are also deleted when the chronological data (for the most recent trip) lie outside of a preestablished period of time. As a rule, this period of time is longer than the period of time for deletion of routes in the intermediate route memory 11.

Of course, the semi-automatic determination of standard routes is also conceivable. In this case, the driver of a vehicle tells the on-board computer, e.g., by pressing a button, that the stored current local positions apply to a new standard route. At the end of the trip, the on-board computer then stores this route directly in the standard route memory 9. No intermediate route memory 11 is required in this embodiment of the invention.

As an alternative to the embodiment described above, the target position derivation device 7 can be designed in the form of a statistical computing algorithm, by means of which a computer, taking into account random deviations, can determine the current route from data on the current local positions.

Naturally, it is also possible to replace the hardware embodiments of the target position derivation device 7, the route comparison device 8, the standard route memory 9, the intermediate route memory 11 and the transfer device 12 at least partially by suitable computer algorithms, which are advantageously processed by the on-board computer 2. Even the control signal 10 can advantageously be generated by a suitable computing program, working together with a suitable hardware device.

Furthermore, the determination of target position and route described here, which is essentially based on stored current local positions, could also be carried out by taking into account the current chronological data or by using such data exclusively. Particularly in the case of routine trips that always occur at the same time, highly reliable conclusions about the current target position and route can be drawn from the chronological data.

We claim:

1. A process for providing navigational assistance to a vehicle driver in reaching a target position in a vehicle, comprising the steps of:

identifying a current local position of the vehicle;

automatically deriving the target position according to probability by comparing stored historical travel information with current travel information including the identified current local positions;

determining a route based on the derived target position;

obtaining current travel tips for the route from a traffic computer disposed outside the vehicle; after the route has been determined; and relaying the tips to the driver.

2. A process as defined in claim 1, wherein the step of identifying current local position includes continuously detecting the current local positions of the vehicle and storing the detected local positions in a working memory, the target position deriving step including determining the target position based on the local positions stores during a first phase of a trip by the vehicle.

3. A process as defined in claim 1, wherein the target position deriving step includes determining the target position based on chronological data including a point in time at which a trip begins.

4. A process as defined in claim 2, wherein the target position deriving step includes determining the target position by comparing the stored current local positions with standard routes stored in a standard route memory.

5. A process as defined in claim 4, including deciding whether the stored current local positions agree with one of the standard routes in the standard route memory with a predeterminable statistical certainty.

6. A process as defined in claim 4, including automatically storing the stored current local positions for determining the standard routes at an end of each trip in an intermediate route memory for a predetermined period of time.

7. A process as defined in claim 6, including transferring a route from the intermediate route memory into the standard route memory when a frequency with which the route is present in the intermediate route memory exceeds a predetermined value.

8. A process as defined in claim 6, including deleting the routes stored in the intermediate memory after expiration of a predetermined period of time.

9. A process as defined in claim 7, including deleting the routes stored in the intermediate memory after being transferred into the standard route memory.

10. A process as defined in claim 7, including storing the standard routes together with chronological data.

11. A process as defined in claim 10, wherein the chronological data include a day of the week and time of day.

12. A process as defined in claim 1, wherein the target position deriving step includes determining the target position with computing programs.

13. A device for providing navigational assistance to a vehicle driver in reaching a target position, comprising:
   local position finding means for detecting a current local position of vehicle;
   route finding means for determining a route, the route finding means including a target position derivation device operative to automatically derive the target position, according to probability, based on stored historical travel information and the detected current local positions;
   communication means for exchanging data with a traffic computer disposed outside the vehicle after the route has been determined; and
   means for relaying travel tips to the driver.

14. A navigational assistance device as defined in claim 13, wherein the local position finding means is operative to continuously detect the current local positions, and further comprising working memory means for storing the continuously detected current local positions, the target position derivation device having stored criteria from which the target position can be derived based on the stored current local positions.

15. A navigational assistance device as defined in claim 13, wherein the stored historical information includes chronological data containing at least a time point at which a trip began.

16. A navigational assistance device as defined in claim 15, wherein the target position derivation device is operative to derive the target position using the chronological data.

17. A navigational device as defined in claim 14, wherein the target position derivation device includes a standard route memory in which routes previously travelled by the vehicle are stored as consecutive local positions, and comparison means for comparing the stored current local positions with routes stored in the standard route memory for deriving the target position.

18. A navigational device as defined in claim 17, and further comprising an intermediate route memory for storing the stored current local positions after an end of each trip.

19. A navigational device as defined in claim 18, and further comprising transfer means for transferring routes from the intermediate route memory into the standard route memory when a frequency with which a given route has been historically travelled exceeds a preestablished value.

20. A navigational device as defined in claim 13, wherein the local position finding means includes an on-board computer.

21. A navigational device as defined in claim 20, wherein the target position derivation device is configured as a calculating program provided in a user memory of the on-board computer.

22. A navigational device as defined in claim 21, wherein the target position derivation device includes at least one statistical computing program.

23. A navigational device as defined in claim 13, wherein the communication means is a mobile phone.

* * * * *